US006914355B2

(12) United States Patent
Cardenas et al.

(10) Patent No.: US 6,914,355 B2
(45) Date of Patent: Jul. 5, 2005

(54) COMMON RADIAL PLANE MOTOR COOLING

(75) Inventors: Alfredo Cardenas, Hermosa Beach, CA (US); Wilfred G. McKelvey, Rancho Palos Verdes, CA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/729,753

(22) Filed: Dec. 4, 2003

(65) Prior Publication Data

US 2004/0118363 A1 Jun. 24, 2004

Related U.S. Application Data

(60) Provisional application No. 60/435,326, filed on Dec. 19, 2002.

(51) Int. Cl.[7] .............................. H02K 9/06; H02K 5/20
(52) U.S. Cl. .......................... 310/58; 310/60 R; 310/89
(58) Field of Search ........................ 310/52, 58, 60 R, 310/62, 89, 90; 384/324, 476; 464/17

(56) References Cited

U.S. PATENT DOCUMENTS

| | | | | |
|---|---|---|---|---|
| 1,479,636 A | * | 1/1924 | Wiard | 310/166 |
| 2,210,692 A | * | 8/1940 | Stokes | 310/58 |
| 2,690,513 A | | 9/1954 | Tamm | |
| 2,753,473 A | * | 7/1956 | Hamm | 310/60 R |
| 3,227,902 A | * | 1/1966 | Laing | 310/59 |
| 3,701,911 A | | 10/1972 | Hallerback | |
| 3,818,255 A | | 6/1974 | Wagner | |
| 3,870,907 A | * | 3/1975 | Hoffman | 310/64 |
| 4,270,064 A | * | 5/1981 | Glandorf et al. | 310/90 |
| 4,659,950 A | | 4/1987 | Gotoh | |
| 5,315,193 A | * | 5/1994 | Kummer et al. | 310/50 |
| 5,701,045 A | * | 12/1997 | Yokozawa et al. | 310/62 |
| 5,844,334 A | * | 12/1998 | Sasaki et al. | 310/58 |
| 6,040,645 A | * | 3/2000 | Lynch | 310/58 |
| 6,411,000 B1 | | 6/2002 | Rew | |
| 6,558,116 B2 | * | 5/2003 | Baer et al. | 415/116 |
| 2003/0030334 A1 | | 2/2003 | Vasilescu | |

* cited by examiner

*Primary Examiner*—Burton Mullins
(74) *Attorney, Agent, or Firm*—Oral Caglar, Esq.

(57) ABSTRACT

The present invention provides a method and apparatus for efficiently cooling a motor. Three components may be used to provide forced air through a motor and a motor bearing. An air guide plate may direct air in and out of a motor and move air through a bearing seal, a shaft, and the motor. The air guide plate also may shield the bearing from heat. A series of holes, with every other hole an inlet hole or an outlet hole, within the motor housing may be arranged in a common radial plane. The incoming air does not mix with the outgoing air. A series of fins on a rotor may move air in and out of the holes within the motor housing.

34 Claims, 2 Drawing Sheets

COMMON RADIAL PLANE MOTOR COOLING

CROSS-REFERENCE TO RELATED APPLICATIONS

This application claims the benefit of U.S. Provisional Patent Application No. 60/435,326, filed on Dec. 19, 2002.

BACKGROUND OF THE INVENTION

The present invention relates generally to cooling a motor and, more specifically, to a method and apparatus for efficiently cooling a motor without mixing hot outlet gases with cool inlet gases.

Turbines, engines, and motors generate heat due to high-speed rotational motion. The generated heat may cause damage to a motor, for example, by severely burning the motor coil. Additionally, excess heat may damage the motor bearings. Thus, it is necessary that generated heat must be discharged.

In a typical motor, cooling air is moved through the motor or bearing to provide cooling. Typically, air is introduced in an axial direction and air exits in a radial direction. Axial introduction of air usually involves blowing hot air over the bearing, causing heating of the bearing. To protect the bearing, diverter plates may be used to isolate the bearing from heat. The hot air may be diverted around the bearing before exiting the motor as outlet air. However, the inlet air is introduced through the same region as the outlet air. This causes the hot inlet air to mix with the cooler outlet air. As heat from the hot inlet air is transferred to the cooler outlet air, the achieved temperature differential is lessened. Consequently, the amount of heat actually removed from the inlet air is less than ideal.

As can be seen, there is a need for an improved apparatus and method for cooling a motor to provide for bearing isolation, efficient cooling, and avoiding mixing inlet air with outlet air.

SUMMARY OF THE INVENTION

In one aspect of the present invention, an apparatus for cooling a motor comprises a motor housing with an upstream side and a downstream side; a shaft; the shaft disposed within the motor housing; an inlet hole in the motor housing; an outlet hole in the motor housing; the inlet hole arranged in the same radial plane as the outlet hole; and an air guide plate; the air guide plate formed to channel air from the inlet hole, over an outer surface of the shaft, and radially outward through the outlet hole.

In an alternative aspect of the present invention, an apparatus for cooling a motor comprises a motor housing with an upstream side and a downstream side; a shaft; an inlet hole in the motor housing; an outlet hole in the motor housing; a rotor mounted on the shaft; the inlet hole arranged in the same radial plane as the outlet hole; and an air guide plate; the air guide plate formed to channel air from the inlet hole, over an outer surface of the shaft, and into the rotor.

In another aspect of the present invention, an apparatus for cooling a motor comprises a motor housing with an axis, an upstream side and a downstream side; a shaft having a cylindrical outer surface; a bearing housing supporting the shaft; a bearing seal on the downstream side of the bearing housing; a plurality of through inlet holes formed in the motor housing; each of the plurality of through inlet holes arranged in the same radial plane; a rotor mounted on the shaft; and a plurality of air guide plates; each of the air guide plates formed to channel air from each of the plurality of through inlet hole, adjacent the bearing seal, over the outer cylindrical surface of the shaft, and into the rotor.

In yet another aspect of the present invention, an apparatus for cooling a motor comprises a motor housing with an upstream side and a downstream side; a shaft having a cylindrical outer surface; an impeller mounted on the shaft; a plurality of rotor fins projecting radially outward from the cylindrical outer surface of the shaft; a plurality of through inlet holes formed in the motor housing; a plurality of through outlet holes formed in the motor housing; each of the plurality of through outlet holes arranged in the same radial plane; and a plurality of air guide plates; each of the air guide plates formed to channel air radially inward from a through inlet hole, over the outer cylindrical surface of the shaft, into the plurality of rotor fins, and radially outward through a through outlet hole.

In a further aspect of the present invention, a motor comprises a die cast aluminum motor housing with an upstream side and a downstream side; an impeller on an aluminum shaft; the shaft coaxial with the motor housing; the shaft having a cylindrical outer surface; a bearing housing on the downstream side of the impeller; a bearing seal on the downstream side of the bearing housing; a plurality of rotor fins projecting radially outward from the cylindrical outer surface of the shaft; a plurality of through inlet holes formed in the motor housing; the plurality of through inlet holes arranged in the same radial plane; a plurality of through outlet holes formed in the motor housing; each of the plurality of through outlet holes arranged in the same radial plane; each of the plurality of through inlet holes arranged in the same radial plane as each of the plurality of through outlet holes; and a plurality of air guide plates; each of the air guide plates formed to channel air from each through inlet hole, over the outer cylindrical surface of the shaft, and into the plurality of rotor fins.

In a still further aspect of the present invention, a method for cooling a motor comprises providing a motor housing; providing a through inlet hole in the motor housing; providing a through outlet hole in the motor housing; directing air radially inward through the through inlet hole, into the motor housing, and radially outward through the through outlet hole; wherein the through inlet hole and the through outlet hole are in the same radial plane; wherein the radial plane is perpendicular to the axis of the motor housing.

These and other aspects, objects, features and advantages of the present invention, are specifically set forth in, or will become apparent from, the following detailed description of a preferred embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The invention is useful for turbines, engines, motors, and other similar apparatuses. Specifically, the invention is useful for cooling motors that generate heat from high rotational speeds. For illustrative purposes, the following description is of a motor, however, it is to be understood that other applications can be substituted for the motor, such as turbines, engines, heat exchangers and other similar apparatuses.

The present invention may protect the bearing from damage from excess heat generated at high rotational speeds and heat generated by the motor. Cooling air may be directed radially inward into a motor, deflected towards a bearing, across a shaft, and accelerated radially outward from the motor. The cooling air entering the motor may never mix with the warm air exiting the motor. Because the air may enter and exit the motor through a common radial plane, heat may be removed from the motor quickly and efficiently.

Figure 1:
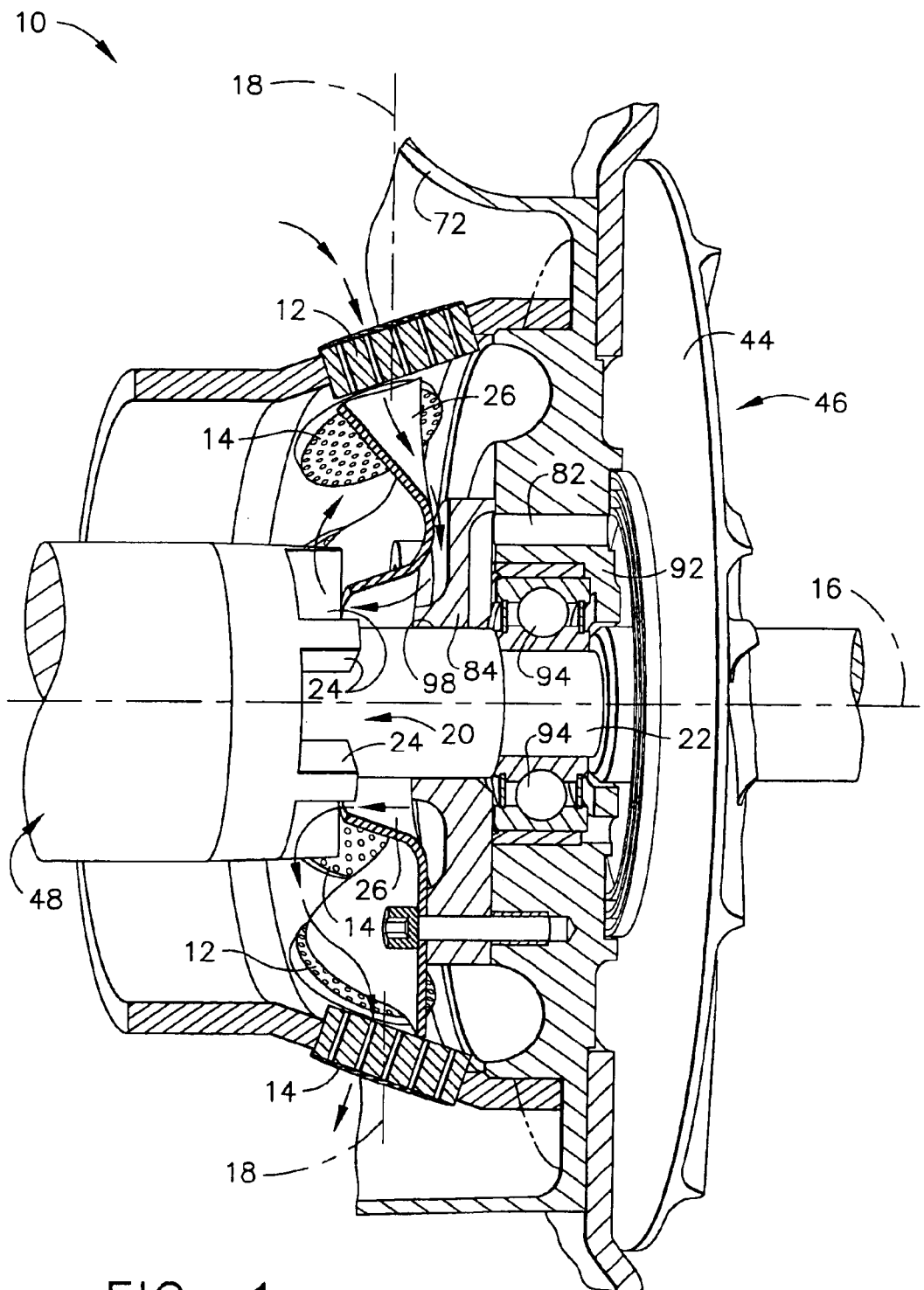
FIG. 1 is a cross-sectional view of an apparatus for cooling a motor within a motor housing, according to an embodiment of the present invention.

In more specifically describing the present invention, and as can be appreciated from FIG. 1, the present invention provides a motor 10. The motor housing 72 may be composed of any suitable material, for example, die cast aluminum. The impeller 44 may be made of aluminum or any other suitable material. The impeller 44 may rotate on a shaft 22, which may also be made of aluminum or any other suitable material. The motor 10 may have an upstream side 46 and a downstream side 48. An axis 16 may be situated centrally within the motor 10. The shaft 22 may be coaxial with the motor housing 10. A bearing housing 92, houses lubricated bearings 94, which may be mounted around a cylindrical outer surface 98 of the shaft 22. The position of the bearing housing 92 may be adjacent to the downstream side 48 of the impeller 44. A bearing seal 84 may be situated downstream from the bearing housing 92, with an optional fluid channel 82 separating the bearing seal 84 from the bearing housing 92. A rotor 20 may include a plurality of rotor fins 24 that project axially upstream of rotor 20 and radially outward from the shaft 22, away from the cylindrical outer surface 98 of the shaft 22. A plurality of through inlet holes 12 may be formed in the motor housing 72; optionally the inlet holes 12 may be situated in a common radial plane. Likewise, a through outlet hole 14 may be formed in the motor housing 72. The through inlet hole 12 may be arranged in the same radial plane 18 as the outlet hole 14. The radial plane 18 may be perpendicular to the axis 16. An air guide plate 26 may be situated between the inlet hole 12 and the outlet hole 14. The air guide pate 26 may be formed to channel air from the inlet hole 12 and out through the outlet hole 14. The air guide plate 26 may also channel air from the inlet hole 12, over the cylindrical outer surface 98 of the shaft 22, and into the plurality of rotor fins 24. Optionally, air from the inlet hole 12 flows adjacent to the downstream side 48 of the bearing seal 84.

Cooling air may enter the motor housing 72 through the inlet hole 12, flow adjacent to the bearing seal 84, and then flow along the outer surface 98 of the shaft 22. This air may then be drawn into the rotor 20, where the rotor fins 24 may act like a centrifugal blower and cause the air to exit radially outward through the outlet hole 14. The air guide plate 26 may act to separate the inlet air from the outlet air and to shield the bearing 94 from excess heat.

With continuing reference to FIG. 1, the motor housing 72 may include a plurality of inlet holes 12, a plurality of outlet holes 14, and a plurality of air guide plates 26. The plurality of inlet holes 12 may be situated in the same radial plane 18. Likewise, the plurality of outlet holes 14 may be situated in the same radial plane 18. Optionally, the plurality of inlet holes 12 may be situated in the same radial plane 18 as the plurality of outlet holes 14. Further cooling may be conducted in which the cooling air enters (for example, radially inward) through the plurality of inlet holes 12, guided by the plurality of air guide plates 26 to flow adjacent to the bearing seal 84, and then flow along the outer surface 98 of the shaft 22. This air may then be drawn into the rotor 20, where the rotor fins 24 may act like a centrifugal blower and cause the air to exit radially outward through the plurality of outlet holes 14. The plurality of air guide plates 26 may serve to effectively shield the bearings 94 form excess heat.

Figure 2:
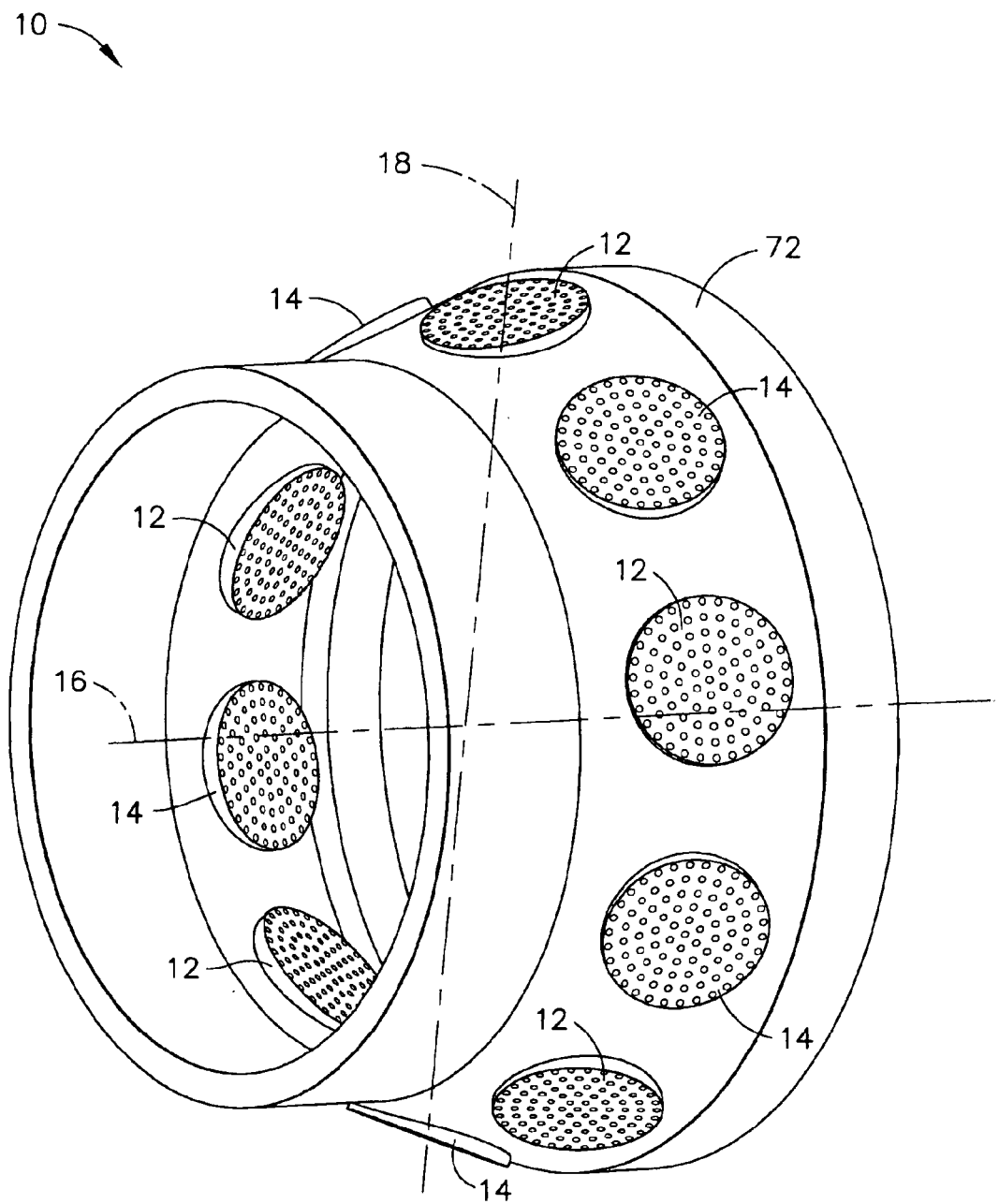
FIG. 2 is a perspective view of the exterior of the motor housing of FIG. 1, according to an embodiment of the present invention.

In FIG. 2, the exterior of the motor housing 72 shows an arrangement of the plurality of inlet holes 12 and the plurality of outlet holes 14. The inlet holes 12 and the outlet holes 14 may alternate. For example, each outlet hole 14 may be located in between two through inlet holes 12.

Returning to FIG. 1, a method for cooling the motor 10 within the motor housing 72 may include providing the motor housing 72 with an axis 16. A through inlet hole 12 and a through outlet hole 14 may be provided in the motor housing 72. The method may continue with providing the rotor 20 on the shaft 22, with the shaft 22 optionally being coaxial with the motor housing 72. Next, air may be directed radially inward through the through inlet hole 12, into the motor housing 72, into a rotor 20, and radially outward through the through outlet hole 14. The method may include using the through inlet hole 12 and the through outlet hole 14 in the same radial plane 18. The radial plane 18 may be perpendicular to the axis 16 of the motor housing 72.

Air may be directed radially inward through a plurality of through inlet holes 12 in the motor housing 72, and radially outward through a plurality of through outlet holes 14 in the motor housing 72. During this method, air may be directed over the outer surface 98 of the shaft 22 before the air is directed into the rotor 20. Also, air may be directed over the surface 98 of the shaft 22 before accelerating air radially outward through the Through outlet hole 14.

We claim:

1. An apparatus for cooling a motor comprising:
a motor housing with an upstream side and a downstream side;
a shaft disposed within the motor housing;
an inlet hole in the motor housing;
an outlet hole in the motor housing;
the inlet hole arranged in the same radial plane as the outlet hole;
an air guide plate formed to channel air from the inlet hole, over an outer surface of the shaft, and radially outward through the outlet hole;
an impeller; and
a bearing housing on the downstream side of the impeller.

2. The apparatus of claim 1, further comprising a bearing seal on the downstream side of the bearing housing.

3. An apparatus for cooling a motor, comprising:
a motor housing with an upstream side and a downstream side;
a shaft;
an inlet hole in the motor housing;
an outlet hole in the motor housing;
a rotor mounted on the shaft;
the inlet hole arranged in the same radial plane as the outlet hole; and
an air guide plate;
the air guide plate formed to channel air from the inlet hole, over an outer surface of the shaft, and into the rotor.

4. The apparatus of claim 3, wherein the rotor comprises a plurality of rotor fins.

5. The apparatus of claim 3, wherein the rotor directs air radially outward through the outlet hole.

6. The apparatus of claim 3, wherein the radial plane is perpendicular to the axis of the motor housing.

7. An apparatus for cooling a motor, comprising:
   a motor housing with an axis, an upstream side, and a downstream side;
   a shaft having a cylindrical outer surface;
   a bearing housing supporting the shaft;
   a bearing seal on the downstream side of the bearing housing;
   a plurality of through inlet holes formed in the motor housing;
   each of the plurality of through inlet holes arranged in the same radial plane;
   a rotor mounted on the shaft; and
   a plurality of air guide plates;
   each of the air guide plates formed to channel air from each of the plurality of through inlet holes, adjacent the bearing seal, over the outer cylindrical surface of the shaft, and into the rotor.

8. The apparatus of claim 7, wherein the radial plane is perpendicular to the axis of the motor housing.

9. The apparatus of claim 7, wherein the rotor comprises a plurality of rotor fins.

10. The apparatus of claim 9, wherein the rotor comprises a centrifugal blower to accelerate air in a radially outward direction.

11. The apparatus of claim 7, further comprising a plurality of through outlet holes, arranged in the same radial plane as the through inlet holes.

12. An apparatus for cooling a motor, comprising:
    a motor housing with an upstream side arid a downstream side;
    a shaft having a cylindrical outer surface;
    an impeller mounted on the shaft;
    a plurality of rotor fins axially spaced downstream from the impeller, and the plurality of rotor fins projecting radially outward from the cylindrical outer surface of the shaft;
    a plurality of through inlet holes formed in the motor housing;
    a plurality of through outlet holes formed in the motor housing;
    each of the plurality of through outlet holes arranged in the same radial plane; and
    a plurality of air guide plates;
    each of the air guide plates formed to channel air radially inward from a through inlet hole, over the outer cylindrical surface of the shaft, into the plurality of rotor fins, and radially outward through a through outlet hole.

13. The apparatus of claim 12, wherein each of the plurality of through inlet holes are arranged in the same radial plane.

14. The apparatus of claim 13, wherein the plurality of through inlet holes are arranged in the same radial plane as the plurality of through outlet holes.

15. The apparatus of claim 12, wherein the shaft comprises aluminum.

16. The apparatus of claim 12, wherein the impeller comprises aluminum.

17. The apparatus of claim 12, wherein the plurality of rotor fins extend axially from the rotor.

18. A motor, comprising:
    a die cast aluminum motor housing with an upstream side and a downstream side;
    an impeller on an aluminum shaft; the shaft coaxial with the motor housing;
    the shaft having a cylindrical outer surface;
    a bearing housing on the downstream side of the impeller;
    a bearing seal on the downstream side of the bearing housing;
    a plurality of rotor fins projecting radially outward from the cylindrical outer surface of the shaft;
    a plurality of through inlet holes formed in the motor housing;
    the plurality of through inlet holes arranged in the same radial plane;
    a plurality of through outlet holes formed In the motor housing;
    each of the plurality of through outlet holes arranged in the same radial plane;
    each of the plurality of through inlet holes arranged in the same radial plane as each of the plurality of through outlet holes; and
    a plurality of air guide plates;
    each of the air guide plates formed to channel air from each through inlet hole, over the cylindrical outer surface of the shaft, and into the plurality of rotor fins.

19. The motor of claim 18, wherein each through outlet hole is located in between two through inlet holes.

20. The motor of claim 18, wherein each air guide plate is formed such that air from each through inlet hole flows adjacent to the downstream side of the bearing seal.

21. A method for cooling a motor, comprising:
    providing a motor housing and a shaft housed within the motor housing, the shaft having a rotor disposed thereon, the rotor including a plurality of rotor fins projecting radially outward from an outer surface of the shaft;
    providing a through inlet hole in the motor housing;
    providing a through outlet hole in the motor housing;
    directing air radially inward through the through inlet hole and into the rotor; and
    directing air radially outward through the through outlet hole;
    wherein the through inlet hole and the through outlet hole are in the same radial plane,
    wherein the radial plane is perpendicular to the axis of the motor housing.

22. The method of claim 21, wherein the rotor accelerates air radially outward through the through outlet hole.

23. The method of claims 22, wherein air is directed over the surface of the shaft before accelerating air radially outward through the through outlet hole.

24. The method of claim 21, wherein air is directed radially inward through a plurality of through inlet holes in the motor housing.

25. The method of claim 24, wherein air is directed radially outward through a plurality of through outlet holes in the motor housing.

26. An apparatus, comprising:
    a motor housing with an upstream side arid a downstream side;
    a shaft disposed within the motor housing;
    an inlet hole in the motor housing;

an outlet hole in the motor housing;

the inlet hole arranged in the same radial plane as the outlet hole;

a rotor disposed on the shaft, the rotor including a plurality of rotor fins projecting radially outward from an outer surface of the shaft; and an air guide plate extending radially inward from the inlet hole to the rotor, wherein:

the air guide plate is adapted to channel air radially inward from the inlet hole into the rotor, the rotor fins are adapted to accelerate air radially outward from the rotor and through the outlet hole; and the rotor fins are disposed downstream of the air guide plate.

27. The apparatus of claim 26, wherein the plurality of rotor fins extend axially upstream from the rotor.

28. The apparatus of claim 26, further comprising:

an impeller mounted on the shaft at a location upstream of the inlet hole, wherein the air guide plate is disposed downstream from the impeller.

29. The apparatus of claim 28, wherein the rotor fins are spaced axially downstream from the impeller.

30. The apparatus of claim 26, wherein the inlet hole comprises a plurality of inlet holes circumferentially spaced on the motor housing.

31. The apparatus of claim 30, wherein:

the outlet hole comprises a plurality of outlet holes circumferentially spaced on the motor housing, and each said outlet hole is disposed between a pair of the inlet holes.

32. The apparatus of claim 26, wherein the apparatus comprises a turbine, an engine, or a heat exchanger.

33. A method for cooling a rotor assembly, comprising:

providing a motor housing and a shaft housed within the motor housing, the shaft having a rotor disposed thereon, the rotor including a plurality of rotor fins projecting radially outward from an outer surface of the shaft, the motor housing having a through inlet hole and a through outlet hole therein;

directing air radially inward from the through inlet hole and into the rotor; and via the plurality of rotor fins, accelerating air radially outward through the through outlet hole, wherein:

the through inlet hole and the through outlet hole are in the same radial plane, and the radial plane is perpendicular to the motor housing axis.

34. The method of claim 33, wherein:

the plurality of rotor fins project axially from the rotor.

* * * * *